Figure 1:
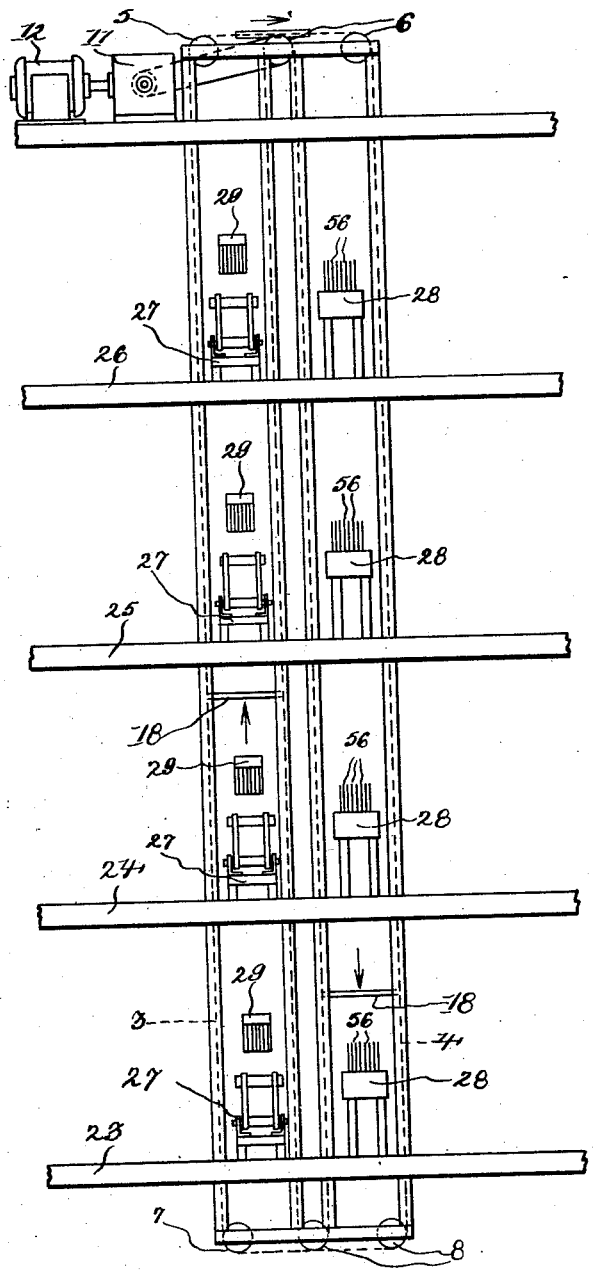

Nov. 17, 1931.        J. CAESAR ET AL        1,832,000
AUTOMATIC LOADING AND DISCHARGE APPARATUS FOR CONVEYERS
Filed Sept. 20, 1929        11 Sheets-Sheet 2

Inventors
John Caesar
William T. Donaldson
By Stryker & Stryker
Attorneys

Nov. 17, 1931.  J. CAESAR ET AL  1,832,000
AUTOMATIC LOADING AND DISCHARGE APPARATUS FOR CONVEYERS
Filed Sept. 20, 1929    11 Sheets-Sheet 3
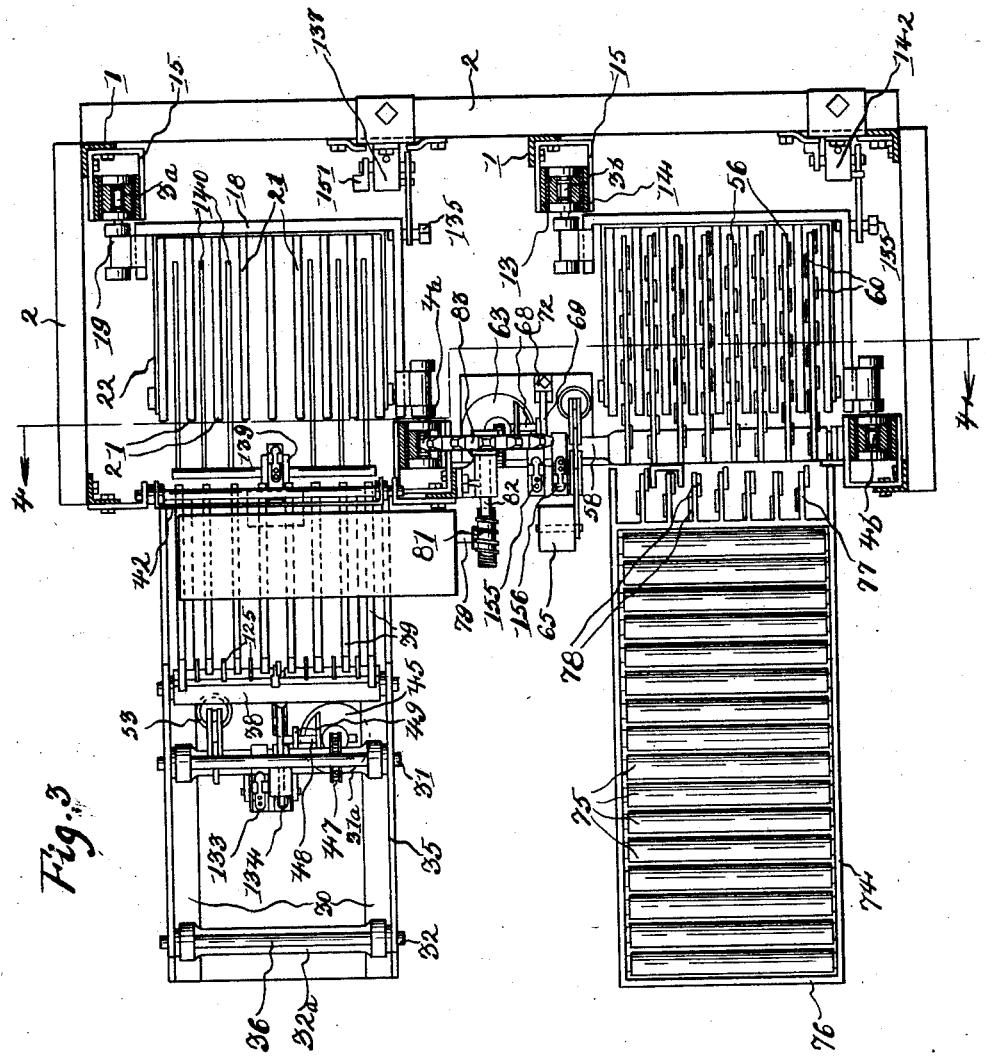
Inventors
John Caesar
William T. Donaldson
By Stryker & Stryker
Attorneys

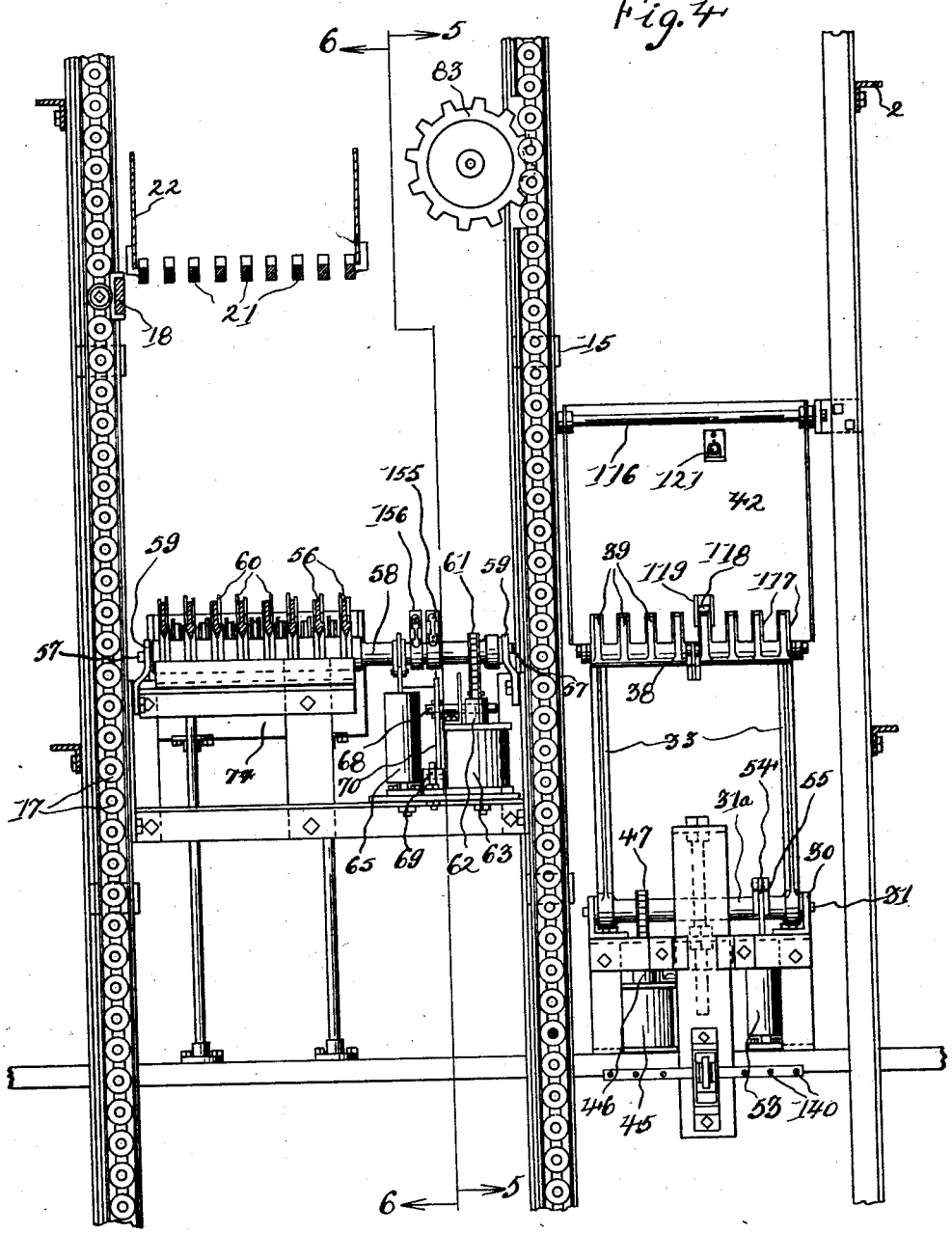

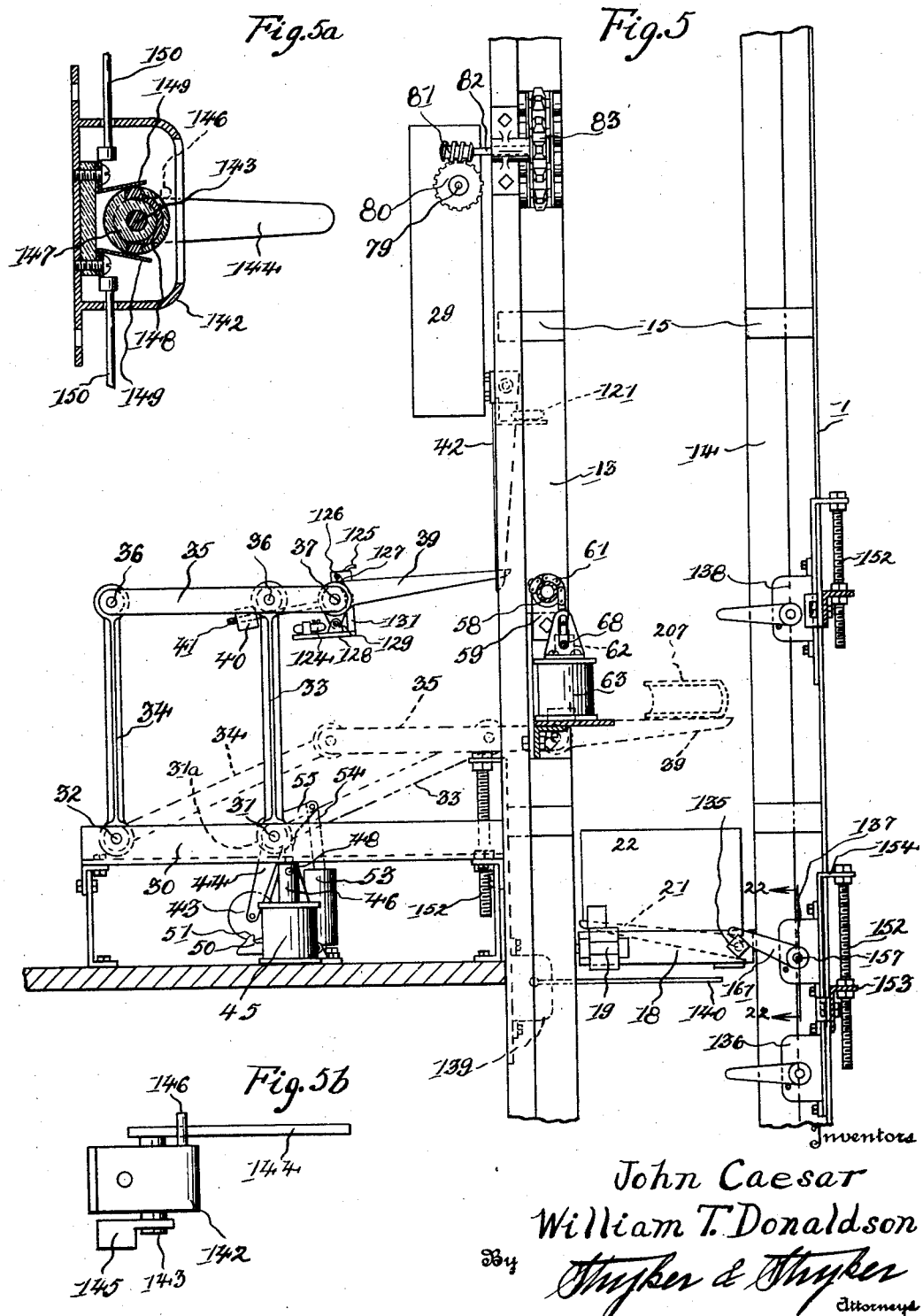

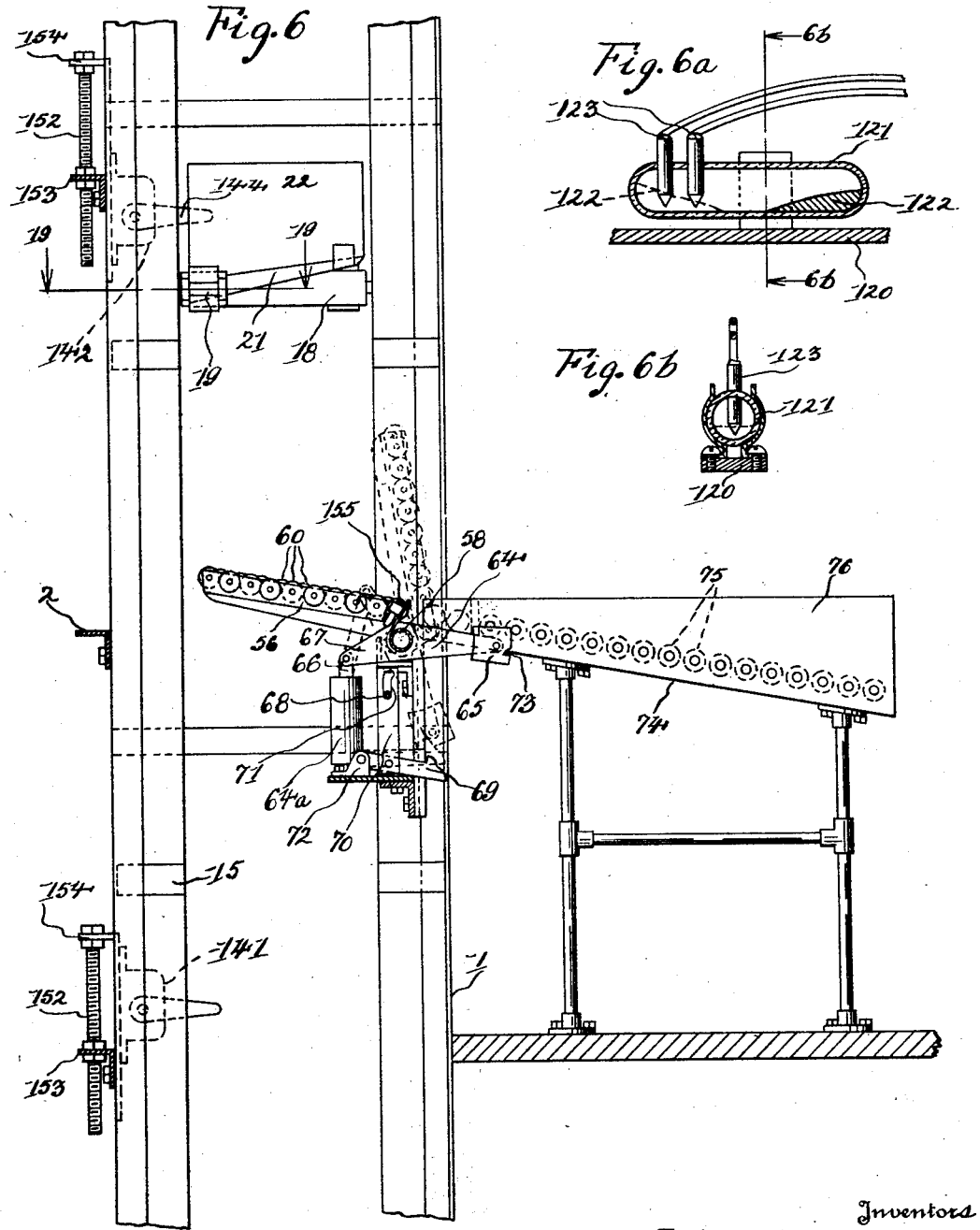

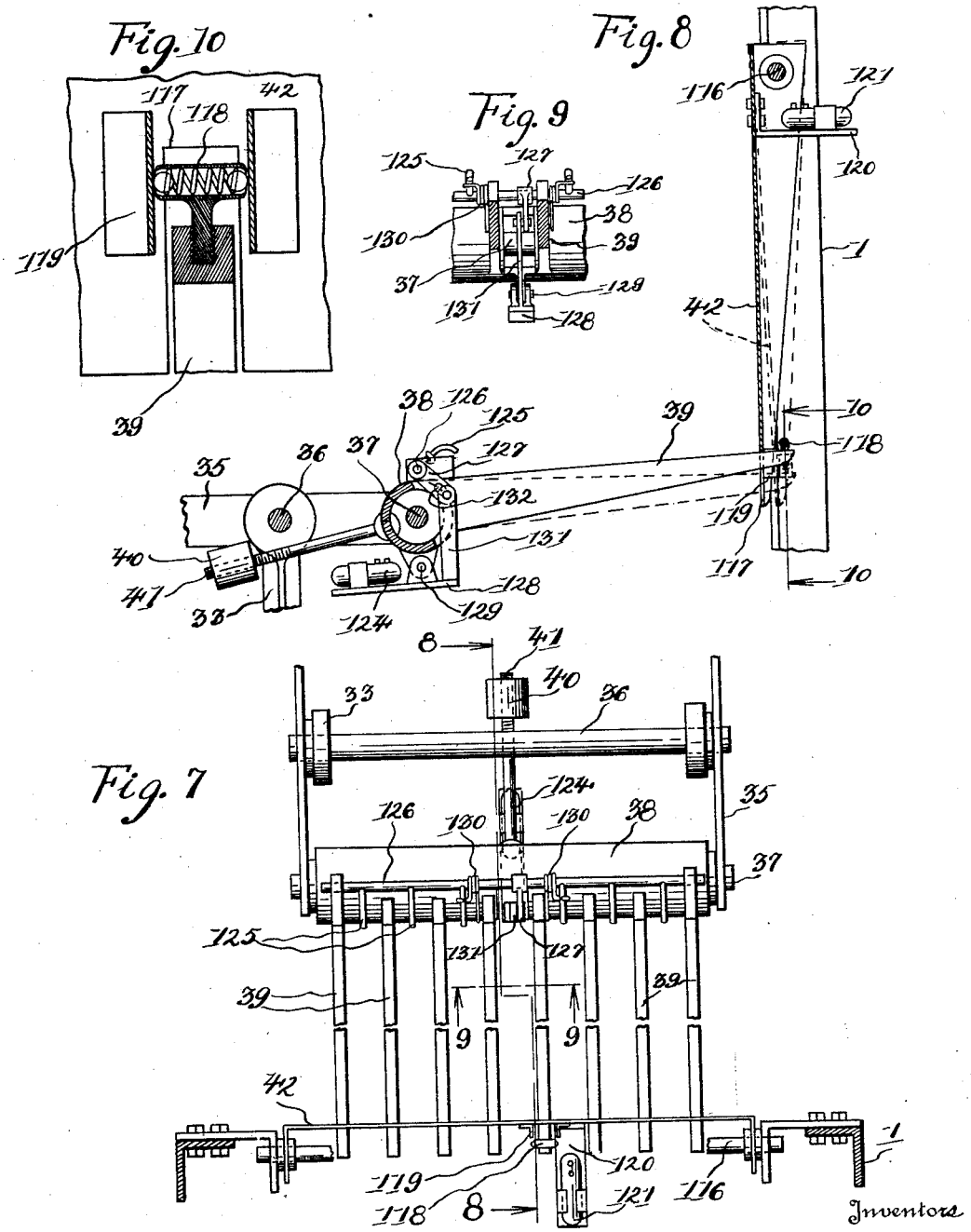

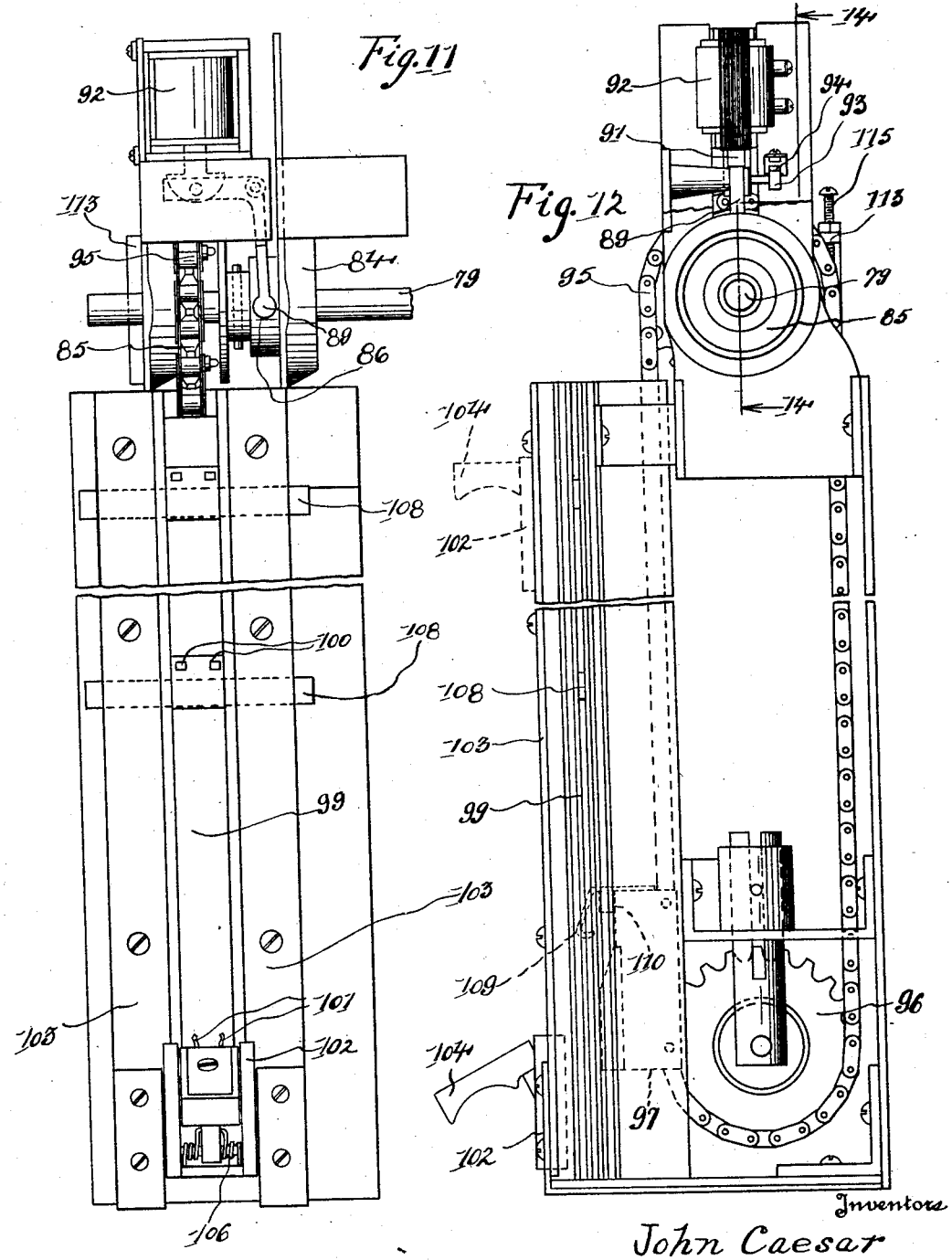

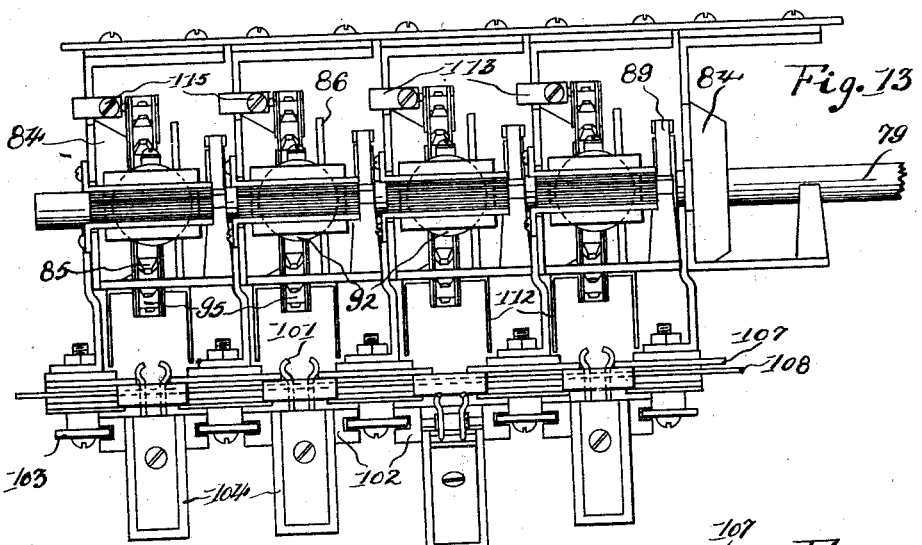
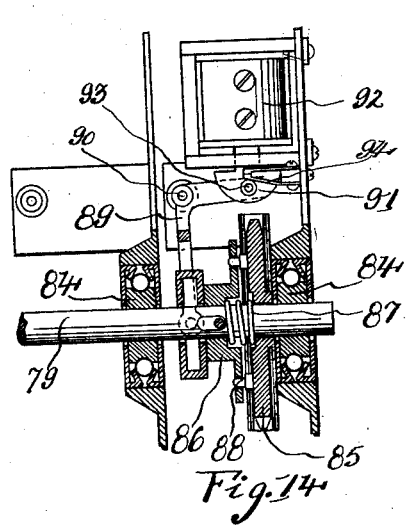
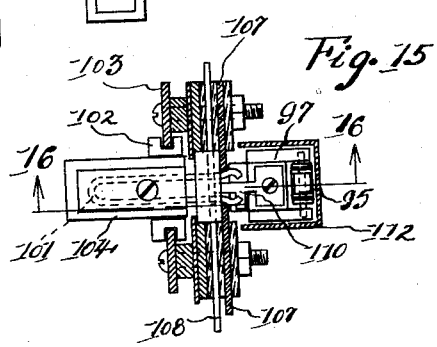
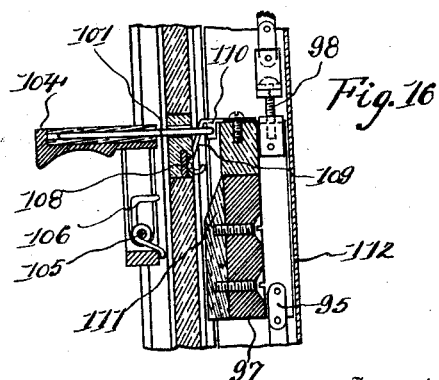
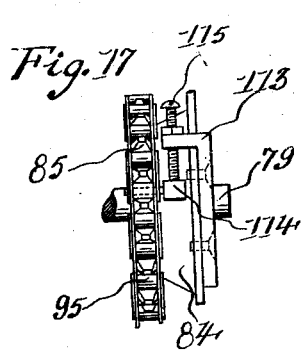

Nov. 17, 1931. J. CAESAR ET AL 1,832,000
AUTOMATIC LOADING AND DISCHARGE APPARATUS FOR CONVEYERS
Filed Sept. 20, 1929  11 Sheets-Sheet 10
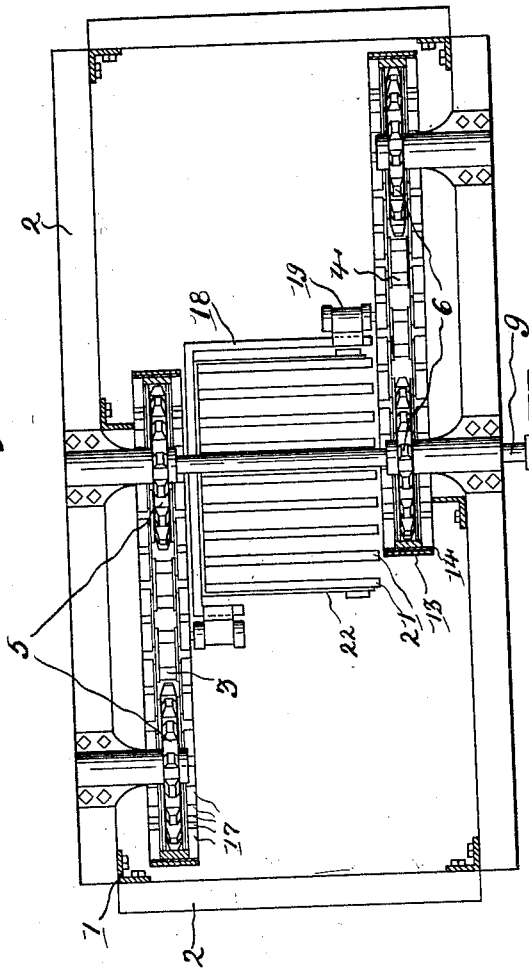
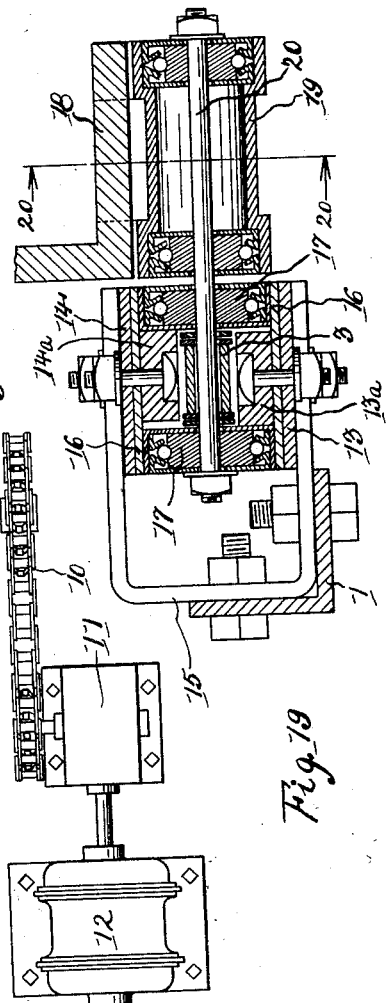
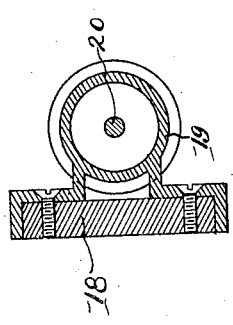
Inventors
John Caesar
William T. Donaldson
By Stryker & Stryker
Attorneys

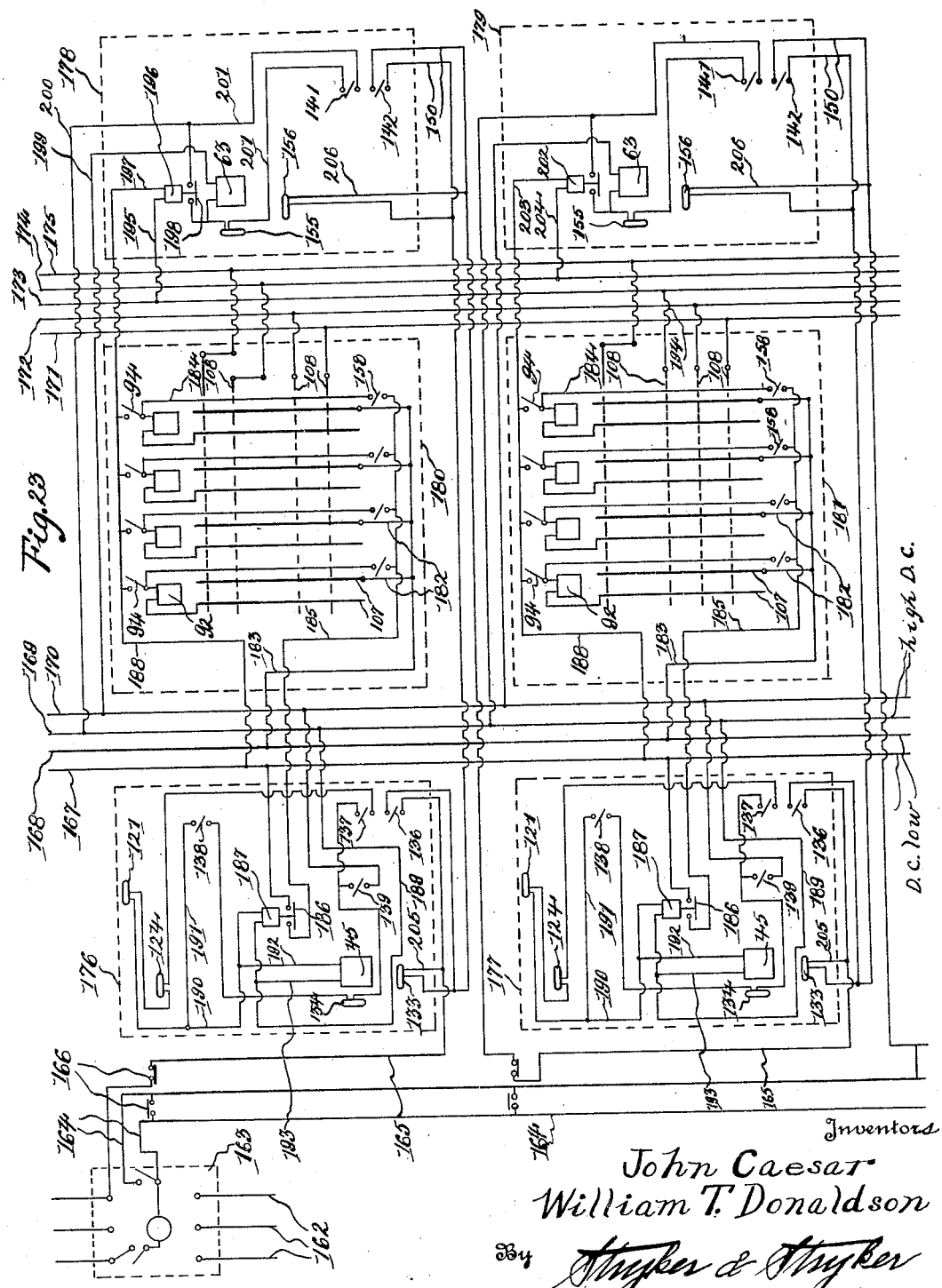

Patented Nov. 17, 1931

1,832,000

UNITED STATES PATENT OFFICE

JOHN CAESAR, OF ST. PAUL, AND WILLIAM T. DONALDSON, OF WHITE BEAR, MINNESOTA, ASSIGNORS TO STANDARD CONVEYOR COMPANY, OF NORTH ST. PAUL, MINNESOTA, A CORPORATION OF MINNESOTA

AUTOMATIC LOADING AND DISCHARGE APPARATUS FOR CONVEYERS

Application filed September 20, 1929. Serial No. 393,963.

This invention relates to conveyers for books, papers or other goods, or containers of the same, to be transported, and, particularly, to means for automatically despatching and delivering the goods to distant stations under control of manually operable selecting devices located at the despatching stations.

It is our object to provide a complete system of this kind whereby manual operations are reduced to a minimum and speed and certainty of operation is secured.

Other objects are to insure against damage to the apparatus and goods by providing safety devices adapted to render the loading and conveying mechanism operative only when the goods are properly placed on the stations and carriers and to prevent interference between loaded carriers and stations.

In the embodiment illustrated and described herein, our device is applied to an elevator designed to receive and deliver the goods to a number of floors of a building. At each floor are loading and unloading stations and a selecting device adapted to be manipulated to control the loading and unloading operations, the selecting device on each floor controlling the unloading stations on all of the other floors. The conveyer or elevator has a pair of chains running in parallel relation to each other and at intervals along these chains are secured in horizontal position, a series of trays or carriers. The trays are maintained in horizontal position throughout their path of travel by the arrangement of the supporting chains. The loading stations are normally positioned at one side of the path of the conveyer trays and the goods to be loaded are placed on these stations which are movable into the path of the tray for loading the latter. A selecting device at each despatching point is adapted to control electrical means for first loading goods properly placed on the loading station onto an empty, ascending tray, and upon arrival of the loaded tray at the selected distant station, the device automatically sets into operation the unloading mechanism. Thus it is only necessary that the operator properly place the goods on the loading station and then set a selecting device in a position corresponding to that of the distant station where the goods are to be unloaded. No further manipulation is required as the operations of loading and unloading the conveyer are entirely automatic.

Figure 2:
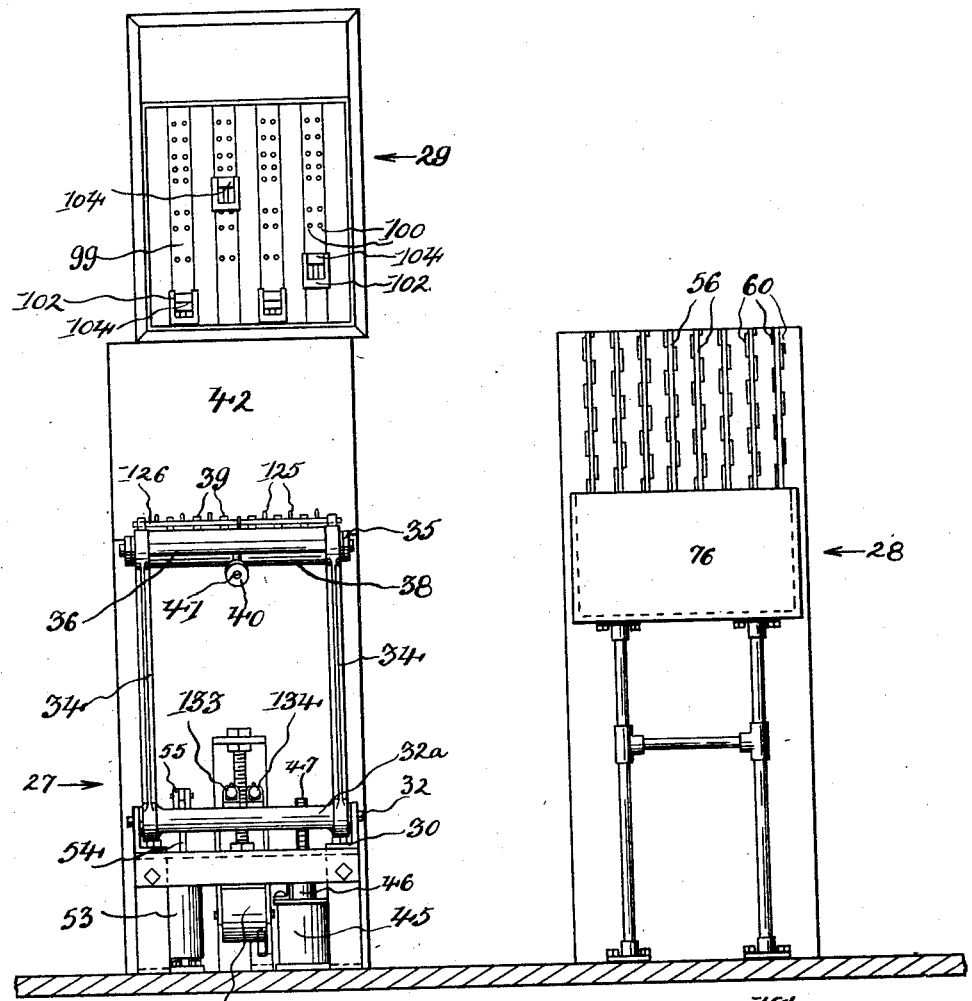
Figure 21:
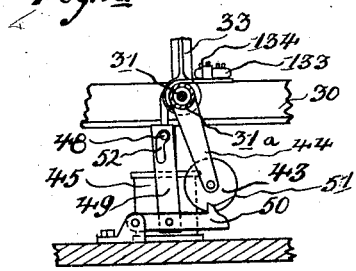
Figure 22:
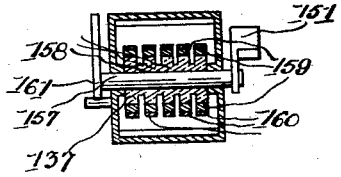

Details of the construction and operation of our invention will be described by reference to the accompanying drawings which illustrate one of the preferred embodiments. Referring to the drawings, Figure 1 is a diagrammatic front elevation, showing the complete conveyer system with despatch and delivery stations and selecting devices at each of four floors of a building; Fig. 2 is a front view of the mechanism at each floor with the housing for the loading apparatus removed; Fig. 3 is a typical plan view of the mechanism at each floor and showing the elevator shaft in horizontal section; Fig. 4 is a section taken on the line 4—4 of Fig. 3; Fig. 5 is a section taken on the line 5—5 of Fig. 4; Fig. 5a is a central vertical section through one of the electrical, tray-operated switches; Fig. 5b is a plan view of said switch; Fig. 6 is a section taken on the line 6—6 of Fig. 4; Fig. 6a is a central longitudinal section through one of the mercury switches; Fig. 6b is a section taken on the line 6b—6b of Fig. 6a; Fig. 7 is a fragmentary plan view of one of the loading stations; Fig. 8 is a section taken on the line 8—8 of Fig. 7; Fig. 9 is a section taken on the line 9—9 of Fig. 7; Fig. 10 is a section taken on the line 10—10 of Fig. 8 and with the load detector shown in the dotted line position indicated in Fig. 8; Fig. 11 is a front elevation of one of the selector units; Fig. 12 is a side elevation of the same; Fig. 13 is a plan view of a complete bank of selector units; Fig. 14 is a section taken on the line 14—14 of Fig. 12; Fig. 15 is a typical horizontal section through one of the selector units showing a selector in operative position; Fig. 16 is a section taken on the line 16—16 of Fig. 15; Fig. 17 is a detail, side view showing the connection between a selector chain and a stationary end stop for the chain; Fig. 18 is a horizontal section through the elevator shaft showing a suitable motor drive and the arrangement of sprockets for operating the main conveyer chain; Fig. 19 is an enlarged horizontal section through one of the connections between an elevator tray and its supporting chain taken on the line 19—19 of Fig. 6; Fig. 20 is a section taken on the line 20—20 of Fig. 19; Fig. 21 is a detail elevation showing the loading station lock mechanism; Fig. 22 is a section through one of the switches taken on the line 22—22 of Fig. 5; Fig. 23 is a wiring diagram showing the electrical connections for two stations representative of the complete system.

Elevator construction

Our elevator is supported in a frame consisting of vertical angle bars 1 connected at suitable intervals by transverse members 2. Endless chains 3 and 4 are arranged to be operated in parallel relation to each other upon pairs of sprocket wheels 5 and 6 at the upper end of the elevator shaft, and similar sprocket wheels 7 and 8 journalled near the lower end of the elevator frame.

As best shown in Fig. 18, a shaft 9 supports and drives one of the sprocket wheels 5 and one of the sprockets 6 at the top of the elevator, said shaft being journalled in suitable bearings on the frame. A projecting end of the shaft 9 is provided with a sprocket wheel arranged to be driven by a chain 10 through a worm gear reduction 11 connecting it with a suitable electric motor 12. Thus, longitudinal reaches 3a and 4a (Fig. 3) of the chains 3 and 4 are caused to ascend at the left side of the elevator, as seen in Fig. 1, and reaches 3b and 4b (Fig. 3) are caused to descend at the right. The ascending and descending reaches of the chains are guided between vertical plates 13 and 14 (Figs. 3 and 19), which are secured in spaced, parallel relation to each other by U-shaped brackets 15. These brackets 15 are bolted to adjacent angle members of the elevator frame, and as best shown in Fig. 19, are provided with sound-deadening strips 16 of wood and fabric upon their wearing faces. The chains 3 and 4 are provided with pairs of rollers 17 to run upon the guides 13 and 14. To prevent lateral movement of the chains, strips 13a and 14a are secured to the inner faces of the guides 13 and 14 between the chain rollers 17.

At suitable intervals, rectangular trays or carriers 18 are secured to the chains 3 and 4. Each carrier 18 is secured at diagonally opposite corners to the chains 3 and 4 respectively, swivel bearings 19 being connected by pins 20 to the chain links. The floor of each tray comprises a series of forwardly and upwardly inclined fingers 21. Side and back walls 22 of each carrier are formed by an angularly bent sheet of metal. The front and top of each tray or carrier is left open to receive and deliver the packages or goods.

By the arrangement described, it will be evident that the trays 18 are retained in horizontal position throughout their path of travel, including the vertical and horizontal runs of the chains 3 and 4.

In the embodiment illustrated, the conveyer or elevator above described is adapted to receive and deliver packages at any of a number of floors of a building indicated by the numerals 23, 24, 25 and 26. At each of these floors a loading station 27, an unloading station 28 and a selecting device 29 is provided.

Loading stations

As best shown in Figs. 3, 4 and 5, each loading station has a pair of parallel frame members 30 supporting parallel shafts 31 and 32, said shafts constituting pivots for roller-like sleeves 31a and 32a respectively. Pairs of arms 33 and 34 are secured respectively to the ends of the sleeves 31a and 32a so as to permit swinging movement from the full line to the dotted line position shown in Fig. 5. At their upper ends the arms 33 and 34 are connected in pairs by links 35 and transverse shafts 36. The links 35 have ends which project toward the elevator and support between them a pivot shaft 37. As shown in detail in Fig. 8 a hub 38 is pivoted coaxially on the shaft 37 and a series of parallel supporting bars 39, for the goods to be loaded and transported, are formed integral with the hub 38. A counterweight 40 is supported on a rod 41 projecting at the opposite side of the axis of the shaft 38 and rigidly secured thereto. This counterweight is arranged to normally retain the bars 39 in their elevated position indicated in full lines in Fig. 8 and to allow downward tilting of said bars under the weight of the lightest packages to be carried. The shaft 36 is a stop for tilting of the rod 41 and bars 39 in one direction, and a guard 42 (hereinafter described) engages the elevated bars 39 to limit tilting in the opposite direction.

The loading station comprising the bars 39 and attached mechanism, including the arms 33 and 34, is movable from the retracted position shown in full lines in Fig. 5 to the extended or loading position indicated in dotted lines. A counterweight 43 supported on an arm 44 projecting from the sleeve 31a is arranged to oppose movement of the arms 33 and 34 which would extend the bars 39 into the path of the trays 18. Movement to extended position is effected by a solenoid 45 having a plunger 46 connected at its upper end to a chain 47 wound upon the sleeve 31a. Thus, when the solenoid 45 is energized by an electric current, the plunger 46 is drawn downward to turn the sleeve and tilt the arms 33 and 34 to the dotted line position shown in Fig. 5.

As best shown in Fig. 21, a pin 48 projects laterally from the plunger 46 and is connected by a link 49 with a dog 50 having a tooth adapted to enter a notch 51 in the counterweight 43. When the loading station is in inoperative or retracted position, the dog 50 is normally held in elevated position so as to engage in the notch 51 and thereby hold the station against accidental displacement into the path of the carriers or trays 18. Initial downward movement of the plunger 46 releases the dog 50 from engagement with the counterweight 43 and further downward movement of the plunger draws the station to extended position while the pin 48 moves downward in an elongated slot 52 in the link 49.

To prevent the quick acting solenoid 45 from creating excessive strain on the mechanism, we provide an air cylinder 53 having a suitable plunger which is connected by a link 54 to a crank arm 55 projecting from the sleeve 31a. The air in the cylinder 53 escapes slowly enough so that the movement of the station to loading position has a cushion stop and is properly regulated.

Unloading stations

The unloading stations, as shown in Figs. 3, 4 and 6, comprise a series of parallel fingers 56, adapted to extent between the bars 21 of the elevator trays and rigidly secured at their outer ends to a hub 58. This hub is pivoted on a shaft 57 and is supported in brackets 59 secured to the elevator frame. Small anti-friction wheels 60 are mounted on the fingers 56 to permit movement of the packages from the carriers by gravity. Wound on the hub 58 is a chain 61 (Fig. 5) secured at one end to the plunger 62 of a solenoid 63. The chain and solenoid are arranged to move the fingers 56 from the dotted line to the full line positions shown in Fig. 6 when the solenoid is energized.

An arm 64 is fixed on the hub 58 to support a counterweight 65 which normally raises the unloading station to the inoperative position indicated in dotted lines in Fig. 6. An air cylinder 64a is provided with a suitable plunger connected by a link 66 to an arm 67 on the hub 58. The air cushion thus provided is adapted to operate during the movement of the station to extended position. Projecting laterally from the plunger 62 of the solenoid is a pin 68 adapted to operate a dog 69 through a connecting link 70 having an elongated slot 71 to receive the pin 68. The dog 69 is pivoted in a bracket 72 and has a tooth arranged to enter a notch 73 in the counterweight 65 when the station is in inoperative or retracted position and the plunger 62 of the solenoid is raised by the action of the counterweight 65. To extend the station into the path of the elevator trays 18, the solenoid 63 is energized. The chain 61 is sufficiently slack to permit initial movement of the plunger to release the dog 69 from the notch 73 in the counterweight 65. Thus, when the station is to be extended, the initial movement of the plunger releases the dog and further downward movement actuates the chain 61 to rotate the sleeve 58 while the pin 68 moves downward in the slot 71. When the solenoid 63 is deenergized, the station is free to turn to inoperative position. It will be noted that the fingers 56 are inclined, when in their fully extended position shown in full lines in Fig. 6, so that packages received thereon are passed by gravity upon the wheels 60 out of the path of the carriers 18. In the embodiment illustrated, a receiving platform 74 is provided with gravity rollers 75 and the sides and ends 76 to retain the packages thereon. A series of fingers 77 carrying small anti-friction wheels 78 project from the platform 74 toward the shaft 57 of the unloading station to form a continuous way for movement of the packages to the receiving table.

Selecting devices

The construction of the selecting devices 29 located at the several despatching points or floors are shown in detail in Figs. 11 to 17, inclusive. Each of these devices has a shaft 79, which projects from a suitable cabinet enclosing mechanism, as shown in Figs. 3 and 5, and is provided with a worm wheel 80 on its projecting end. This worm wheel is driven by a worm 81 on a shaft 82 driven by a sprocket wheel 83 in operative connection with the chain 4. Thus the shaft 79 is continuously driven at a speed proportional to that of the chain 4. The shaft 79 is journalled in suitable bearings 84 and extends axially through a series of freely rotating sprocket wheels 85 and clutch members 86 which are movable longitudinally on the shaft to operatively connect the sprocket wheels thereto. In the arrangement illustrated, four complete selector units are arranged to be driven independently of each other from the shaft 79. As the several units are identical only one will be described in detail.

As best shown in Fig. 14, the clutch member 86 is normally held in spaced relation to the sprocket wheel 85 by a coil spring 87 and small studs 88 project from one face of the sprocket wheel to engage perforations in the clutch disc, which is keyed to the shaft and arranged to slide longitudinally thereon in well known manner.

A fork 89 for shifting the clutch is pivoted upon a pin 90 and has a laterally extending arm having a pivotal connection with the armature 91 of an electro-magnet 92. A pin 93 projects at one side of the armature 91 to close a switch contact 94 when the electro-magnet is energized.

Each of the sprocket wheels 85 is arranged to operate a chain 95 having a guide sprocket 96 at its lower end. Fixed on the chain 95 is a contact carriage 97 having an adjustable screw connection 98 with the chain, as shown in Fig. 16. This contact carriage is movable adjacent to and behind a panel 99 formed with pairs of perforations 100 to selectively receive the prongs 101 of a manually operable station selector 102. The station selector 102 is slidable in parallel relation to the adjacent reach of the chain 95 and is guided by a pair of strips 103 on the front of the panel. These strips 103 engage grooves in the sides of the selector. A tiltable handle 104 carries the contact prongs 101 and is pivoted upon a pin 105 so as to permit the insertion and withdrawal of the prongs 101 through the perforations 100. A small coiled spring 106 is mounted on the pivot pin 105 and normally holds the handle and prongs 101 in their retracted position, shown in full lines in Figs. 11 and 12.

The panel 103 has a laminated structure being built up from layers of suitable insulating material between which are secured a series of stationary electrical conductors or bus bars connected in the electrical circuits hereinafter described. As best shown in Fig. 15, two vertical bus bars 107 extend in the panel 99 with their inner edges in position to make contact with the prongs 101 when the latter are inserted in any pair of perforations 100. Thus when the prongs are inserted they complete the circuit between the bus bars 107. Extending across the panel 103 are bus bars 108 which, as hereinafter described, are electrically connected in the circuits controlling the un-loading stations on the several floors of the building. These horizontal bus bars 108 are disposed in the path of a spring contact finger 109 mounted on the carriage 97 (Fig. 16) the finger 109 being arranged to project between and out of contact with the bus bars 107. A laterally projecting contact finger 110 is mounted on the carriage 97 to make contact with one of the prongs 101 simultaneously with the contact between the finger 109 and bus bar 108. The carriage 97 has mounted upon its front surface a cam 111 adapted to engage and automatically displace the prongs 101 from the perforations 100 upon continued upward movement of said carriage, and a guide channel 112 is provided for the carriage 97. To limit downward movement of the carriage 97 adjacent to the panel 99 a small bracket 113 (Figs. 13 and 17) is secured to the supporting frame and projects into the path of a laterally projecting lug 114 mounted on the chain 95 near the upper end of its back or remote reach. An adjusting screw 115 is threaded in the bracket 113 and engages the lug 114 at its lower end to provide an accurate adjustment for the normal or starting position of the carriage 97.

Each of the four selector devices above described operates independently of the others at each station and the shaft 79 is continuously rotated to actuate the contact carriage 97 of any of the four units. A unit is brought into operation by manual movement of a selector handle 104 from the inoperative position shown in full lines in Fig. 12 to the dotted line position shown therein so as to insert a pair of the prongs 101 into a pair of perforations 100 corresponding to the distant station where a load is to be delivered. Further operation of the selector unit is automatic and is effected by the energizing of the electro-magnet 92 at the proper moment. This actuates the clutch member 86 through the arm 89 to operatively connect the sprocket wheel 85 with the shaft 79. The chain 95 is thus driven slowly to raise the contact carriage 97 behind the panel 99. In the embodiment illustrated, we have so connected the contact carriage with the elevator chain 4 that said carriage moves at one-hundredth of the speed of the elevator carriages or trays. When the spring finger 110 on the upwardly moving carriage 97 brushes against one of the prongs 101 and the finger 109 simultaneously makes electrical connection with one of the horizontal bus bars 108, the circuit to a distant unloading station is rendered operative. Finally, as the carriage 97 continues to move upward, the cam 111 strikes the ends of the prongs 101 and forces them out of the perforations 100 with the aid of the spring 106. Now the selector handle is free to drop to an inoperative position at the bottom of the panel and the circuits to magnet 92 and bus bar 108 are broken. The prongs 101 are constructed from spring wire and tend to spring apart so as to make spring contact with the vertical bus bars 107 and the extremities of said prongs are bowed outward to retain them in place against the action of the spring 106 when inserted in the openings 100.

*Safety devices and electric switches*

As best shown in Figs. 4 and 8, the guard 42 has the form of a sheet metal apron suspended at the forward end of the bars 39 upon a horizontal pivot shaft 116. Slots 117 extend upward from the lower edge of the guard 42 to receive the bars 39, and, as shown in Figs. 7 and 10, one of the bars 39 has on its upper surface a detent 118 adapted to frictionally engage angle clips 119 mounted on the guard 42. This detent 118, when moved into engagement with clips 119, retains the guard 42 in its forwardly extended position indicated in dotted lines in Fig. 8 and permits the forward and downward movement of the arms 39 required for the loading operation. A bracket 120 is secured to the guard 42 and carries on its upper surface an electric switch 121 adapted to be closed when the guard 42 is in the dotted line position shown in Fig. 8, but being normally open when said guard is in the full line position. To render the loading station operative, the goods to be loaded must be advanced against the guard 42 to move said guard to the dotted line position.

As shown in Figs. 6a and 6b, the switch 121 is of the type comprising a glass tube containing a small quantity of mercury 122 and having the terminals 123 of the circuit wires projecting into the tube near one end. The circuit is completed by the tilting of the tube longitudinally in such a direction as to cause the mercury 122 to make contact with both terminals 123. Switches of this type, which are known commercially as "mercoid" switches, are used at a number of points in our system.

To further insure proper location of the proposed load on the supporting bars 39 of the loading station, we provide a switch 124 (Figs. 7 and 8). This switch is operable (by movement of upwardly projecting fingers 125) to prevent the loading operation when the proposed load is too large or improperly placed on the loading station. The fingers 125 project rigidly from a pivot rod 126 and a centrally located crank 127 projects from the rod 126 to actuate a tilting support 128 for the switch 124. The support 128 is pivoted upon a pin 129 held in a downwardly projecting ear on the hub 38. The fingers 125 are normally extended upward by a pair of coiled springs 130 on the rod 126, said springs engaging the hub 38 and a pair of the fingers 125. A rigid arm 131 projects upward from the support 128 and is connected by a pivot pin to the crank 127, said crank having a slot 132 to receive a pin. Thus a load which depresses the fingers 125 holds the switch 124 in open position notwithstanding the fact that the bars 39 are depressed and tend to close the switch 124. Rigidly supported on the hub 31a is another safety switch 133 which tilts with said sleeve and is closed only when the loading station is in fully retracted position. A similar switch 134 is mounted in parallel relation to the switch 133 and has wire terminals attached to its forward end so that the switch is closed only when the loading station is extended toward the path of the elevator carriages. The latter described switch operates to hold the circuit for the solenoid 45 closed during the period required for the loading of an elevator tray.

Each of the carriages 18 has a projecting member 135 adapted to successively actuate switches 136, 137 and 138 as the carriage approaches and passes a loading station. A fourth switch 139 at each loading station has fingers 140 projecting therefrom to pass between the bars 21 of the carriages and move the switch to open position if the carriage is loaded. At each unloading station switches 142 and 141 are arranged to be successively actuated by the carriage. Details of the construction of the switches 141 and 142 are shown in Figs. 5a and 5b, the construction of the other normally closed switches 136, 138 and 139 being similar, except for the direction of movement of the projecting arms and counterweights therefor. The switch 142 has a suitable casing providing a bearing for a pivot shaft 143 upon one end of which is fixed an arm 144 to be engaged by the elevator carriages and on the other end of which is attached a counterweight 145 adapted to normally hold the arm 144 against a stop pin 146. The hub 147 of the shaft 143 is formed from insulating material and has imbedded therein electric contact elements 148 adapted to complete the circuit between a pair of contact springs 149 engaging the periphery of the hub and connected in circuit with wires 150. The switch 137 differs from those above described in that it is normally open and the counterweight 151 (Figs. 3 and 22) is arranged to retain the switch arm against a stop pin located beneath the same. This switch 137 is closed by raising the operating arm. A similar arrangement of counterweights is provided on the switches 136, 138 and 139, but these are normally closed. The switches 136, 137, 138, 139, 141 and 142 are made adjustable along the elevator frame by supporting them upon long screws 152. Angle bars 153 extend between the vertical members 1, and the screws 152 are secured by suitable nuts engaging the opposite faces of the angle bars. The several switch casings are bolted to brackets 154 suspended from the upper ends of the bolts 152.

At the unloading stations, switches 155 and 156 are rigidly supported on the hub 58 and arranged to be tilted therewith to open and close circuits. These switches are of the type illustrated in Figs. 6a and 6b, the switch 155 being normally open when the unloading station is in inoperative or retracted position. The switch 156 is normally closed when the station is in inoperative position.

As best shown in Fig. 22, the switch 137 has an axial shaft 157 adapted to actuate simultaneously four switches 158 controlling the current supply respectively to the several units of the local selecting device 29. Each of the switches 158, like the switch 142, has an insulated contact element 159 on the shaft 157 adapted to complete the circuit between a pair of brushes 160. The switches 158 are normally open and are closed when an upwardly moving elevator tray actuates the switch arm 161.

Wiring of the system

In Fig. 23 is shown diagrammatically the wiring connections for the motor and for the several instruments located at two floors of a building or other stations.

The electric motor 12 for operating the elevator trays is supplied with current from a three-wire circuit 162 under control of a starter 163 of any suitable or well known construction. This starter is in turn under control of start and stop circuits 164 and 165, respectively. The latter circuit includes local circuits at the several loading and unloading stations. Manually operable start and stop switches 166 are also provided to control the circuits 164 and 165 respectively at the stations or floors. Low voltage, direct current circuit wires 167 and 168 and relatively high voltage, direct current circuit wires 169 and 170 supply the several selector units and station operating solenoids respectively. Other circuit wires, extending between the selector devices and unloading stations, are indicated by the numerals 171 to 175, inclusive.

In the wiring diagram, Fig. 23, the local circuits associated with two loading stations are enclosed within dotted line rectangles 176 and 177 and the circuits of the unloading stations corresponding thereto are indicated within the rectangles 178 and 179, and the corresponding selector unit circuits are within rectangles 180 and 181. Each electro-magnet 92 for operating a selector unit clutch is in circuit with one of the bus bars 107 of a pair, the other bus bar of the same pair being connected by wires 182 and 183 with the low voltage supply wire 168. To complete the circuit for each electro-magnet 92, a wire 184 extends to one of the control switches 158, and the several switches 158 are in parallel branches of a wire 185 connected to the wire 167 through an armature 186 of a relay having a coil 187. Each switch 94 is arranged to by-pass the circuit including the corresponding switch 158 and armature 186 through a circuit wire 188 connected to the supply wire 167. The coil 187 of the relay for each loading station is adapted to be supplied with current from the wires 169 and 170 through wires 189 and 190 which form a circuit including in series the switches 121, 124, 137 and 139. A branch circuit 191 of the circuit 189—190 includes the switches 138 and 134. Branch wires 192 and 193 extend from the wires 190 and 189 respectively to connect the coil of the solenoid 45 in a circuit parallel to that of the relay 187.

The horizontal bus bars 108 are indicated in the wiring diagram by horizontal dotted lines. Each of these, at a particular, local station is connected to one of the wires 171 to 175 inclusive which extend to the respective distant unloading stations. If it be assumed that the unloading stations, indicated by rectangles 178 and 179, are those of the third and second floors respectively of a five floor building, the bus bars 108 of the selector unit at the second floor are connected by the wires 171, 173, 174 and 175 with the unloading stations for the fifth, fourth, third and first floors respectively. For example, the third from bottom bus bar 108 is connected by a wire 194 with the wire 173 and the latter wire is connected by the circuit wire 195 to the coil 196 of a relay for the unloading station at the third floor. The circuit through the relay coil 196 is completed through a wire 197 constituting a branch of the wire 188. The armature 198 of the relay is arranged to close the higher voltage circuit through the solenoid 63. The latter circuit includes a wire 199 connected to the supply wire 170 and a wire 200 connected to the supply wire 169. A branch 201 of the circuit last described includes the switches 155 and 141, this branch being arranged to by-pass or shunt the part of the circuit including the armature 198.

A relay 202 for the unloading station at the second floor is connected by wires 203 and 204 with the wires 188 and 174 respectively. Relays for the unloading stations at the first, fourth and fifth floors are similarly connected to the wires 171, 174 and 175 respectively. The local circuits for the several unloading stations are otherwise identical with those above described, and the circuits for the first, fourth and fifth floors have only obvious modifications from those described.

Circuits which control the operation of the elevator trays are located at each of the loading and unloading stations to insure safety of operation. The motor stop circuit wire 165 has in series with it the wires 150 and switches 136 and 142 at each floor. In a circuit 205 the switch 133 is arranged in parallel with the switch 136 so that the circuit including the wire 165 is open when both of the switches 133 and 136 are open, but is closed when either of them is closed. The switch 156 at each unloading station is arranged in a circuit 206 parallel to the circuit including switch 142 to cause the motor to stop when both of these switches are open.

Operation

In the operation of our device the motor 12 continuously drives the chains 3 and 4 to cause the series of trays 18 to ascend in front of the loading stations and to descend in front of the unloading stations, the trays being maintained in horizontal position by the chains attached to diagonally opposite corners. The bars 39 of the loading stations are normally retracted from the path of the trays 18 as indicated in full lines in Fig. 5 and the bars 56 of the unloading stations are normally retracted in substantially the dotted line position indicated in Fig. 6. When a load, such as a book 207, or other object, is to be transported, the selecting device at the local station should be operated and then the book or other object is placed on the bars 39 and moved forward thereon to actuate the guard 42 from the full line to the dotted line position indicated in Fig. 8. This closes the switch 121 and as the weight of the load is placed on the bars 39, said bars tilt to the dotted line position (Fig. 8) and thereby close the switch 124. If the load thus placed on the station is too large to be handled by the system, or if it is so placed that it rests on the fingers 125 the support 128 for the switch 124 will be tilted upon its pivot 129 to retain said switch in open position and thereby prevent the loading operation.

The operator grasps the handle 104 of a selector unit at the local station and moves the selector 102 upward to a position corresponding to the distant station where the load is to be delivered. He then pivots the handle carrying the prongs 101 upon the pivot pin 105 and inserts said prongs into the selected pair of openings 100. For example, it may be assumed that the operation above described is performed with the apparatus at the second floor of the building represented in Fig. 23 within rectangle 181 and it is desired to send the load to the third floor where the unloading station circuits are indicated by the rectangle 178. To control delivery to such station the operator inserts the prongs 101 into a pair of perforations 100 corresponding to the horizontal bus bar 108 connected to the wire 194 (Fig. 23). The prongs 101 thus render operative the circuit between a pair of the vertical bus bars 107 and a current supply is furnished at a point where the contact carriage 97 subsequently closes the circuit including the wires 194, 173, 195, relay coil 196 and wire 197. After thus selecting the place of delivery for a particular load the operator places the load on the bars 39 and in proper position to render the loading station operative, i. e., to close switches 121 and 124.

Now, as the succeeding elevator tray 18 approaches the loading station where the load has been placed and where the selector has been moved to operative position, the member 135 on the carriage first strikes the arm on the switch 136 so that said switch is opened. This however does not effect the operation of the system if the switch 133 on the loading station is closed. If the latter switch is open, as in case the loading station is improperly extended in the path of the trays, the motor stop circuit 165 will be held open and the motor and carriage will stop until the defect is remedied. In the normal operation it will be understood that the bars 39 are fully retracted from the path of the elevator trays so that the trays continue upward after actuating the switch 136. If the approaching tray 18 is empty, the switch 139 will not be moved from its normally closed position and the tray will pass on to the switch 137. On the other hand, if the approaching tray is loaded, the fingers 140 of the switch 139 will strike the load and such switch will be moved to open position and will be held open while the tray closes the switch 137. As long as the switch 139 is open the circuits to the solenoid 45 and relay 187 are held open so that the loading station cannot operate.

When an empty tray approaches the switch 137 and raises the arm 161, the shaft 157 is turned to close the switches 137 and 158. This, in the normal operation where the load has been properly placed on a fully retracted loading station, starts the local selector carriage 97 upward and actuates the solenoid 45 to extend the bars 39 carrying the load into the path of the empty tray 18. The circuits thus completed extend from the current supply wire 170 through the switches 139, 137, wire 190, switches 124 and 121, solenoid 45 and the parallel circuit through the relay coil 187 and wire 189 extending to the supply wire 169. The armature 186 is thereby actuated to close the low voltage circuit including supply wire 167, wire 185, one of the switches 158, and clutch magnet 92 of the particular selector unit where a pair of prongs 101 has been inserted to electrically connect the corresponding pair of vertical bus bars 107. The circuit from the prongs 101 passes to the wires 182 and 183 connected to the supply wire 168 and, when the magnet 92 thus energized has closed the holding switch 94 to shunt the switch 158, the circuit is completed through the wire 188.

The clutch connected to the energized magnet 92 is thus moved to operatively connect the continuously rotating shaft 79 with the sprocket wheel 85 driving the corresponding selector chain 95. This slowly raises the carriage 97 until the cam 111 thereon strikes the prongs 101 and displaces them from the openings 100 thus breaking the selector circuit. Shortly prior to the movement of the cam 111 to displace the prongs 101, the spring fingers 109 and 110 electrically connect one of the prongs 101 with the corresponding horizontal bus bar 108. Where the prongs have been inserted adjacent to the horizontal bus bar connected to wire 194, as above assumed, the circuit to the relay 196 is completed by simultaneous engagement of the spring fingers 109 and 110 with the bus bar 108 and prongs 101, this circuit including supply wire 168, wires 183 and 182 to one of the bus bars 107, thence through prongs 101 to spring fingers 110, 109, bus bar 108 and wire 194 at the local station, and wires 173, 195, relay 196, and wires 197, 188 and 167 at the distant unloading station.

While the above described operation is taking place under control of the local selector unit, the energizing of the local solenoid 45 has caused the plunger 46 to be drawn downward to rotate the sleeve 31a about its pivot shaft 31 and thereby thrust the upright arms 33 and 34 forward, carrying the bars 39 out into the path of the rising tray. The load on the bars 39 is thus picked up by the fingers 21 of the tray 18 which continues upward and strikes the projecting arm on the switch 138. This opens the circuit through the solenoid 45 and allows the counterweight 43 to retract the loading station to a position where it is locked by the dog 50. It will be understood that while the loaded carriage is moving from the station where it is loaded to the top of the elevator frame and down to the selected unloading station the contact carriage 97 of the operative selector unit is moving from its position at the bottom of the panel 99 to the position corresponding to the distant unloading station as represented by the location of the horizontal bus bar 108 connected to such distant unloading station. As above indicated, the vertical distances traversed by the contact carriage to the several horizontal bus bars 108 may, for convenience, be made one-hundredth of the distance from the local switch 137 to the corresponding distant stations where the loads are to be delivered. The required reduction in speed of the contact carriage is effected by the sprocket wheel 83, worm 81, worm wheel 80 and sprockets 85 which operatively connect the elevator chain 4 with the chain 95 carrying the contact carriage 97. By this arrangement, we cause the loaded elevator tray to approach the selected distant unloading station at the moment that the spring fingers 109 and 110 at the local station complete the circuit to such distant station. In the example above assumed, this circuit includes the coil of the relay 196 so that the armature 198 closes the higher voltage circuit from wires 169 and 170 including the wire 200, armature 198, solenoid 63 and wire 199. The energized solenoid 63 actuates the chain 61 to rotate the hub 58 and extend the unloading station bars 56 to the full line position indicated in Fig. 6. The fingers 21 of the descending loaded tray 18 pass between the bars 56 and deposit the load on the antifriction wheels 60 whence the load passes by gravity onto the receiving table 74. Continued downward movement of the empty tray 18 brings the member 135 of the tray in engagement with the arm of the switch 141 which is operated to open the solenoid circuit including the wires 200, 201, switch 141 and switch 155. The latter switch is closed by the tilting of the unloading station toward extended position and remains closed until the switch 141 is opened to return to inoperative position by the mechanical action of the counterweight 65.

The dog 69 is provided to prevent accidental displacement of the unloading station into the path of the descending carriers. However, we provide further protection against interference between the carriages and unloading stations whereby the operation of the elevator is stopped in the event that an unloading station is improperly extended into the path of the carriages 18. The switch 156 is, as above described, open when the unloading station is wholly or partially extended into the path of the elevator trays and the switch 142 is located some distance above the unloading station so that when this normally closed switch is opened by the passage of a tray the elevator will be stopped in the event that the switch 156 is also open, these switches being arranged in the elevator stop circuit 165 as shown in Fig. 23.

Having described our invention what we claim as new and desire to protect by Letters Patent is:

1. The combination with a conveyer, of loading stations and electrically operated unloading devices disposed along the conveyer, a selecting device at each loading station, means for moving an element of said selecting device in timed relation to the conveyer, electrical means connecting said selecting device to the several distant unloading stations, contacts on said selecting device adapted to render a selected distant unloading device operative upon the arrival of a load at said station and means independent of said selecting device for rendering the unloading devices inoperative after an unloading operation.

2. The combination with a conveyer, of loading stations and electrically operated unloading devices disposd along the conveyer, a selecting device having an element adapted to be driven in timed relation to the conveyer at each loading station, means operatively connecting said selecting device to all of the distant unloading stations, means coacting with said element adapted to render any selected unloading device operative upon the arrival of a load at said station and means for moving said element at a speed proportional to the speed of the conveyer.

3. The combination with a conveyer, of loading stations and electrically operated unloading devices disposed along the conveyer, a selecting device for each loading station operatively connected to the several unloading devices, an element of said selecting device being movable in timed relation to the conveyer, means coacting with said selecting device to render the same operative upon the loading of the conveyer at a loading station, said selecting device rendering a selected, distant unloading device operative upon arrival of a load adjacent thereto and means for rendering each unloading device inoperative upon the completion of an unloading operation.

4. The combination with a conveyer, of loading stations and electrically operated unloading devices disposed along the conveyer, a selecting device at each loading station operatively connected to the several unloading devices, an element of said selecting device movable in timed relation to said conveyer, means coacting with said selecting device to start movement of said element and render the same operative upon the loading of the conveyer at a local station, said selecting device rendering a selected distant unloading device operative upon movement of said element a distance proportional to the distance to the selected unloading device and means for rendering the unloading devices inoperative upon the completion of unloading operations.

5. The combination with a conveyer, of loading stations and electrically operated unloading devices disposed along the conveyer in pairs, a selecting device for each of said loading stations, means operatively connecting said selecting device to said unloading devices, means coacting with said selecting device to render the same operative upon the loading of the conveyer, said selecting device having stationary and movable contact elements adapted to render a selected distant unloading device operative upon arrival of the load at a selected station and said selecting device having elements movable in timed relation to the conveyer and at a reduced speed and means for rendering the unloading devices inoperative upon the completion of unloading operations.

6. The combination with a conveyer and loading and unloading stations disposed along said conveyer in pairs, of selecting devices located near each loading station and each comprising a manually operable member adapted to be placed in positions corresponding to the relative positions of the distant unloading stations, means under control of said member for actuating said unloading stations, a contact carriage associated with said member, means for moving said contact carriage in timed relation to the conveyer, contacts on said member and carriage to render said station actuating means operative upon the movement of said carriage a distance proportional to the distance traversed by the conveyer between the loading station and a distant unloading station selected by said manually operable member and electrical means to render the distant unloading station inoperative.

7. The combination with a conveyer, of a plurality of stations disposed in spaced relation to each other along said conveyer, a loading device, an unloading device and an automatic station selecting device located near each of said stations, said loading and unloading devices being adapted to despatch and deliver goods to and from the conveyer respectively, electrical means connecting each selecting device with a plurality of distant unloading devices for operating said unloading devices, a contact carriage associated with each selecting device and means for moving said contact carriage in timed relation to said conveyer, at a reduced speed, said carriage coacting with said electrical means to render a distant unloading device operative upon the movement of a load from the local loading device to the selected distant unloading device.

8. The combination with a conveyer and a series of carriers secured at intervals to said conveyer, loading and unloading stations associated with said conveyer, said carriers being movable adjacent to said stations, a selecting device at each loading station, electrical means connecting the several distant unloading stations to each selecting device for rendering said stations operative under control of said devices, means for driving an element of each selecting device in timed relation to said conveyer, contacts associated with said element and controlling said electrical means for delaying the operation of said unloading stations and electrical means having elements projecting into the path of said carriers for controlling said selecting device.

9. The combination with a conveyer and a series of carriers secured at intervals to said conveyer, loading and unloading stations associated with said conveyer, said carriers being movable adjacent to said stations, a selecting device at each loading station, electrical means connecting the several distant unloading stations to each selecting device for rendering said stations operative under control of said devices, a control switch having a member projecting into the path of said carriers for rendering said selecting device operative upon the approach of an empty carrier and a second switch having an element projecting into the path of said carriers for preventing the operation of said loading station upon the approach of a loaded carrier.

10. The combination with a conveyer and a series of carriers secured at intervals to said conveyer, loading and unloading stations associated with said conveyer, said carriers being movable adjacent to said stations, a selecting device at each loading station, electrical means connecting the several distant unloading stations to each selecting device for rendering said stations operative under control of said devices and means actuated by the carriers for returning said stations to inoperative position.

11. The combination with a conveyer and carriers secured in spaced relation on said conveyer, of a plurality of loading and unloading devices mounted adjacent to the path of said carriers and movable into and out of said path, a selecting device near each loading device, electrical means connecting each of said selecting devices to the distant unloading devices, a contact carriage for each selecting device, means for moving said contact carriages in timed relation to said conveyer, contacts associated with said contact carriages and with said electrical means to control the movement of the distant unloading stations to operative position in the path of the carriers and means for starting the operation of said contact carriage upon the loading of a carriage.

12. The combination with a conveyer and carriers secured in spaced relation on said conveyer, a plurality of loading and unloading devices mounted adjacent to the path of said carriers and movable into and out of said path, a selecting device near each loading device, electrical means connecting each of said selecting devices to the distant unloading devices, a contact carriage for each selecting device, means for moving said contact carriages in timed relation to said conveyer, contacts associated with said contact carriages to control the movement of said distant unloading stations to operative position in the path of the carriers, means actuated by the approaching carriers at each loading station for starting the operation of said contact carriage, an element of each selecting device movable to selected positions corresponding to the distant unloading devices and coacting with the adjacent contact carriage to render a distant unloading station operative and means operable by the carriers near each unloading device to return said unloading devices to inoperative position.

13. The combination with a conveyer, of unloading devices for removing articles from said conveyer at a number of points along said conveyer and a selecting device located at a point remote from said unloading devices, said selecting device comprising electrical means connecting the same with the several unloading devices, a contact movable in timed relation to the conveyer and a manually movable contact adapted to be secured in selected positions along the path of said movable contact corresponding to the relative positions of the distant unloading devices.

14. The combination with a conveyer, of unloading devices for removing articles from said conveyer at a number of points along said conveyer and a selecting device located at a point remote from said unloading devices, said selecting device comprising electrical control circuits connecting the same with the several unloading devices, a contact movable in timed relation to the conveyer and a manually movable contact adapted to be secured in selected positions along the path of said movable contact corresponding to the relative positions of the distant unloading devices, said contacts coacting to complete one of said control circuits after an interval of time determined by the selected position of said manually movable contact.

15. The combination with a conveyer of unloading devices for removing articles from said conveyer at a number of points along said conveyer and a selecting device located at a point remote from said unloading devices, said selecting device comprising separate electric circuits connecting the same with the several unloading devices, each of said circuits having a terminal at said selecting device, a contact movable in timed relation to the conveyer adjacent to said terminals and a manually movable contact adapted to be secured in selected positions corresponding to the positions of said terminals.

16. The combination with a main conveyer and spaced loading and unloading stations disposed along said conveyer, of a traveler associated with said loading station and movable at a speed proportional to the main conveyer, a contact movable by said traveler, electrical means including stationary contacts disposed along said traveler in the path of said movable contact for severally controlling the operation of the distant unloading stations, said stationary contacts being spaced along said traveler distances proportional to the spacing of said loading station from the several distant unloading stations, means for rendering said movable contact operative on said traveler at a predetermined time and a selector contact adapted to be secured in positions corresponding to said stationary contacts to render a selected distant unloading station operative.

17. The combination with a main conveyer and spaced loading and unloading stations disposed along said conveyer, of a movable contact carriage associated with said loading station and movable at a speed proportional to the main conveyer, a contact movable by said carriage, electrical means including stationary contacts disposed in the path of said movable contact for severally controlling the operation of the distant unloading stations, said stationary contacts being spaced apart distances proportional to the spacing of the several distant unloading stations, electrical means including a switch for rendering said movable contact operative on said carriage and a selector contact adapted to be secured in positions corresponding to said stationary contacts to render the several distant unloading stations operative.

18. The combination with a main conveyer and loading and unloading stations disposed along said conveyer, of a traveler associated with said loading station and movable at a speed proportional to the main conveyer, a contact movable by said traveler and having a normal, stationary position, electrical means including stationary contacts disposed along said traveler in the path of said movable contact for severally controlling the operation of the distant unloading stations, said stationary contacts being spaced from the normal stationary position of said movable contact distances proportional to the distances between said loading station and the several distant unloading stations, means for starting said movable contact on said traveler upon the loading of the main conveyor at said loading station and a selector contact element adapted to be secured in operative positions and coacting with said stationary contacts to render a selected distant unloading station operative.

19. The combination with a main conveyer and loading and unloading stations disposed along said conveyer, of a traveler associated with each loading station and movable at a speed proportional to the main conveyer, a contact movable by said traveler and having a normal, stationary position, electrical means including stationary contacts disposed along said traveler in the path of said movable contact for severally controlling the operation of the distant unloading stations, said stationary contacts being spaced from the normal, stationary position of said movable contact distances proportional to the distances between the associated loading station and the several distant unloading stations, means for starting said movable contact on said traveler upon the loading of the main conveyer, a selector contact element adapted to be secured in positions corresponding to said stationary contacts to render the several distant unloading stations operative, said selector contact having an initial position near one end of said traveler and means for returning said movable and selector contacts to their initial positions upon the movement of said traveler a predetermined distance.

20. The combination with a conveyer having an upwardly movable portion and a series of carriers secured to the conveyer, of a feed table movable into and out of the path of said carriers, pivoted arms supporting said table and means for simultaneously tilting said arms toward the path of said carriers to thereby move said table into the path of said carriers for loading the same.

21. The combination with a conveyer having an upwardly movable portion and a series of carriers secured to the conveyer, of a substantially horizontal feed table mounted at one side of the path of said carriers to receive and support articles to be loaded, a pivoted support for said table adapted to maintain the same in substantially horizontal position and means for actuating said support to extend said table obliquely downward into the path of said carriers for loading the same.

22. The combination with a conveyer having an upwardly movable portion and a series of carriers secured to the conveyer, of a feed table mounted at one side of the path of said carriers to receive and support articles to be loaded, a plurality of arms pivotally supporting said table and arranged to permit movement of the same into the path of said carriers while maintaining said table in substantially horizontal position and means for actuating said arms to move said table into the path of said carriers for loading the same.

23. The combination with an upwardly movable conveyer and carriers secured at intervals to said conveyer, said carriers having spaced bars for supporting the articles carried thereby, of two pairs of upwardly extending arms mounted adjacent to the path of said carriers and connected together to move in unison, a series of spaced, parallel bars pivotally supported upon the upper ends of said arms to receive articles to be loaded on said conveyer and means for tilting said arms to project said last mentioned bars into the path of said carriers for loading the same.

24. The combination with a conveyer and a series of carriers secured to the conveyer, of a feed table movable into and out of the path of said carriers, electrical means for moving said table into the path of said carriers and electrical control means including a switch having a member projecting into the path of said carriers to automatically move said table into the path of said carriers for loading the same.

25. The combination with a conveyer, of a load receiving table movable into the path of said conveyer, means for normally maintaining said table out of the path of said conveyer, a normally open switch having an actuating element movable by a load on said table to closed position, electrical means for extending said table into the path of said conveyer and a control circuit for said last mentioned means including said switch whereby extension of said table into the path of said conveyer is prevented when said switch is open.

26. The combination with a conveyer having spaced carriers, of a substantially horizontal feed table mounted at one side of the path of said conveyer to receive and support articles to be loaded, said table being mounted for slight tilting movement when a load is placed thereon, electrical means for extending said table into the path of said carriers for loading the same, a normally open switch, means connecting said switch to said table for opening the switch when the table is tilted by the placing of a load thereon and a control circuit for said electrical means including said switch whereby the extension of said table is permitted only when said switch is closed.

27. The combination with a conveyer, an electric control circuit for said conveyer and a series of carriers secured to the conveyer, of loading and unloading devices movable into and out of the path of said carriers, electric means for moving said devices into the path of said carriers, a plurality of normally closed switches associated with each of said devices in series in said control circuit the switches for each device being arranged to permit operation of the elevator when any one of the switches is closed, means for opening one of said switches when the associated device is extended and means projecting into the path of said carriers for opening another of said switches upon the approach of one of said carriers to the associated device.

28. The combination with a conveyer, an electric control circuit for said conveyer and a series of carriers secured to the conveyer, of a loading table movable into and out of the path of said carriers, means for moving said table into the path of said carriers, a plurality of normally closed switches in series in said control circuit but in parallel with each other, means for opening one of said switches when said table is extended and means projecting into the path of said carriers for opening another of said switches upon the approach of one of said carriers to said table.

29. The combination with a conveyer, of a substantially horizontal feed table mounted at one side of the path of said conveyer to receive and support articles to be loaded, said table being mounted for slight tilting movement when a load is placed thereon, electrical means for extending said table into the path of said conveyer for loading the same, a normally open switch, means connecting said switch to said table for opening the same when the table is tilted by the placing of a load thereon, a second normally open switch having an actuating element movable by a load on said table to closed position and a control circuit for said electrical means including said switches in series whereby the extension of said table is permitted only when both of said switches are closed.

30. The combination with a conveyer and carriers secured at intervals to said conveyer, of a load receiving table movable into the path of said carriers, means for normally maintaining said table out of the path of said carriers, a normally open switch having an actuating element movable by a load on said table to closed position, electrical means for extending said table into the path of said carriers, a second normally open switch having a member projecting into the path of said carriers and a control circuit for said electrical means including said switches in series whereby extension of said table into the path of said carriers is prevented when either of said switches are open and said table is automatically extended upon the closing of both switches.

31. The combination with a conveyer and a series of carriers secured at intervals on said conveyer, of an unloading device movable into and out of the path of said carriers, electric means for moving said device into said path, a switch having an element projecting into the path of said carriers, a control circuit including said electric means and switch and means for returning said device to retracted, inoperative position upon engagement of a carrier with said element of said switch.

32. The combination with a conveyer and a series of carriers secured at intervals on said conveyer, of an unloading device movable into and out of the path of said carriers, electro-magnetic means for moving said device into said path, a normally closed switch having an element projecting into the path of said carriers and movable by a carrier to open position, a control circuit including said electric means and switch and means for returning said device to retracted, inoperative position under the opening of said switch.

33. The combination with a main conveyer and spaced unloading stations disposed along said conveyer, of a contact carriage movable at a speed proportional to the main conveyer, a contact movable by said carriage, electrical means, including stationary contacts disposed in the path of said movable contact, for severally controlling the operation of the distant unloading stations, said stationary contacts being spaced along the path of said contact carriage distances proportional to the spacing of the several unloading stations, electrical means including a switch for rendering said movable contact operative and selector means adapted to be moved to operative positions and coacting with said movable contact to render the several distant unloading stations operative.

34. The combination with a conveyer, of loading mechanism mounted at one side of the path of said conveyer, electric means for actuating said loading mechanism, a normally open switch, means associated with said loading mechanism and operable by a load for closing said switch and a control circuit for said electric means, including said switch, whereby the movement of a load to loading position is permitted only when said switch is closed.

35. The combination with a conveyer having spaced carriers to be loaded, of loading mechanism mounted at one side of the path of said carriers, actuating means for said loading mechanism, control means associated with said loading mechanism and operable by a load for rendering said actuating means operative, and a second control for said loading mechanism disposed to be actuated by said carriers and coacting with said first mentioned control to load said carriers.

36. The combination with a conveyer having spaced carriers to be loaded, of loading mechanism mounted at one side of the path of said carriers to receive a load, actuating means for said loading mechanism, a control associated with said loading mechanism and operable by a load on said mechanism for rendering said actuating means operative, a second control for said loading mechanism operable by a load improperly placed on said mechanism to render said actuating means inoperative, and a third control disposed to be actuated by said carriers and co-acting with said first and second controls to load said carriers.

37. The combination with a conveyer having spaced carriers to be loaded, of loading mechanism mounted at one side of the path of said carriers to receive a load, actuating means for said loading mechanism, a control associated with said loading mechanism and operable by a load on said mechanism for rendering said actuating means operative, a second control for said loading mechanism arranged to be actuated by said carriers and coacting with said first control to load said carriers and a third control, operable by a load on a carrier approaching said mechanism, to prevent the loading of a previously loaded carrier.

38. The combination with a conveyer having spaced carriers of feeding mechanism mounted at one side in the path of said carriers and having an extensible member movable into the path of said carriers, electric means for actuating said extensible member to extend articles into the path of said carriers, a normally open switch, means associated with said feeding mechanism and operable by a load for closing said switch and a control circuit for said electrical means, including said switch, whereby the movement of a load to loading position is permitted only when said switch is closed.

39. The combination with a conveyer, of feeding mechanism mounted at one side of the path of said conveyer to receive and support articles to be loaded on the conveyer, an element of said mechanism being movable to loading position, actuating means for extending said loading element, a normally open switch, means for closing said switch by the placing of a load on said mechanism, means operable by a load improperly loaded on said mechanism for holding said switch in open position, a second, normally open, switch movable to closed position by the proper placing of a load on said mechanism and a control circuit for said actuating means, including said switches in series, whereby the movement of said loading element to operative position is permitted only when both of said switches are closed.

40. The combination with a conveyer, of feeding mechanism mounted at one side of the path of said conveyer to receive and support articles to be loaded on the conveyer, an element of said mechanism being movable to loading position, actuating means for extending said loading element, a normally open switch, means for closing said switch by the placing of a load on said mechanism, a second, normally open, switch movable to closed position by the proper placing of a load on said table and a control circuit for said actuating means, including said switches in series, whereby the movement of said loading element to operative position is permitted only when both of said switches are closed.

41. The combination with a conveyer, an electric control circuit for said conveyer and a series of carriers secured to the conveyer, of a load support movable into and out of the path of said carriers, means for moving said support into the path of said carriers, a plurality of normally closed switches in series in said control circuit, but in parallel with each other, means for opening one of said switches when said support is extended in said path and means projecting into the path of said carriers for opening another of said switches upon the approach of one of said carriers to said support.

In testimony whereof, we have hereunto signed our names to this specification.
JOHN CAESAR.
WILLIAM T. DONALDSON.